US005510806A

United States Patent [19]

Busch

[11] Patent Number: 5,510,806
[45] Date of Patent: Apr. 23, 1996

[54] PORTABLE COMPUTER HAVING AN LCD PROJECTION DISPLAY SYSTEM

[75] Inventor: John P. Busch, Austin, Tex.

[73] Assignee: Dell USA, L.P., Austin, Tex.

[21] Appl. No.: 492,142

[22] Filed: Jun. 19, 1995

Related U.S. Application Data

[63] Continuation of Ser. No. 144,081, Oct. 28, 1993, abandoned.

[51] Int. Cl.$^6$ ..................................................... G09G 3/36
[52] U.S. Cl. .......................... 345/87; 345/905; 364/708.1; 361/681
[58] Field of Search ................................. 345/87, 9, 204, 345/905; 348/744, 745, 766, 789, 794; 364/178, 708.1; 361/681; 353/119

[56] References Cited

U.S. PATENT DOCUMENTS

| | | | |
|---|---|---|---|
| 4,027,959 | 6/1977 | Fisher et al. | 353/119 |
| 4,120,574 | 10/1978 | Hofmann et al. | 353/119 |
| 4,403,216 | 9/1983 | Yokoi | 345/9 |
| 4,803,652 | 2/1989 | Maeser et al. | 364/708.1 |
| 5,262,926 | 11/1993 | Hall | 361/681 |

Primary Examiner—Richard Hjerpe
Assistant Examiner—Kent Chang
Attorney, Agent, or Firm—Henry Carrana; Michelle Turner

[57] ABSTRACT

A portable computer has a base housing portion to which a display screen structure is pivotally connected. The display screen structure is defined by a solid, relatively thin plastic screen panel instead of the usual lid/display screen housing having mounted therein an LCD panel, a panel illumination system and associated display electronics. To form a selectively variable image on the screen panel a relatively small LCD projection structure is mounted on the top side of the base housing for pivotal movement relative thereto between an upwardly extending use orientation and a downwardly retracted storage and transport orientation. The LCD projection structure includes a lens housing having a lens disposed therein, a small LCD projection panel supported on an underside portion of the lens, and a high intensity light source supported beneath the LCD projection panel. During use of the computer, screen driver circuitry within the base housing is used to form a selectively variable image on the LCD panel, and the illumination source causes the image to be projected in magnified form onto the raised screen panel.

3 Claims, 1 Drawing Sheet

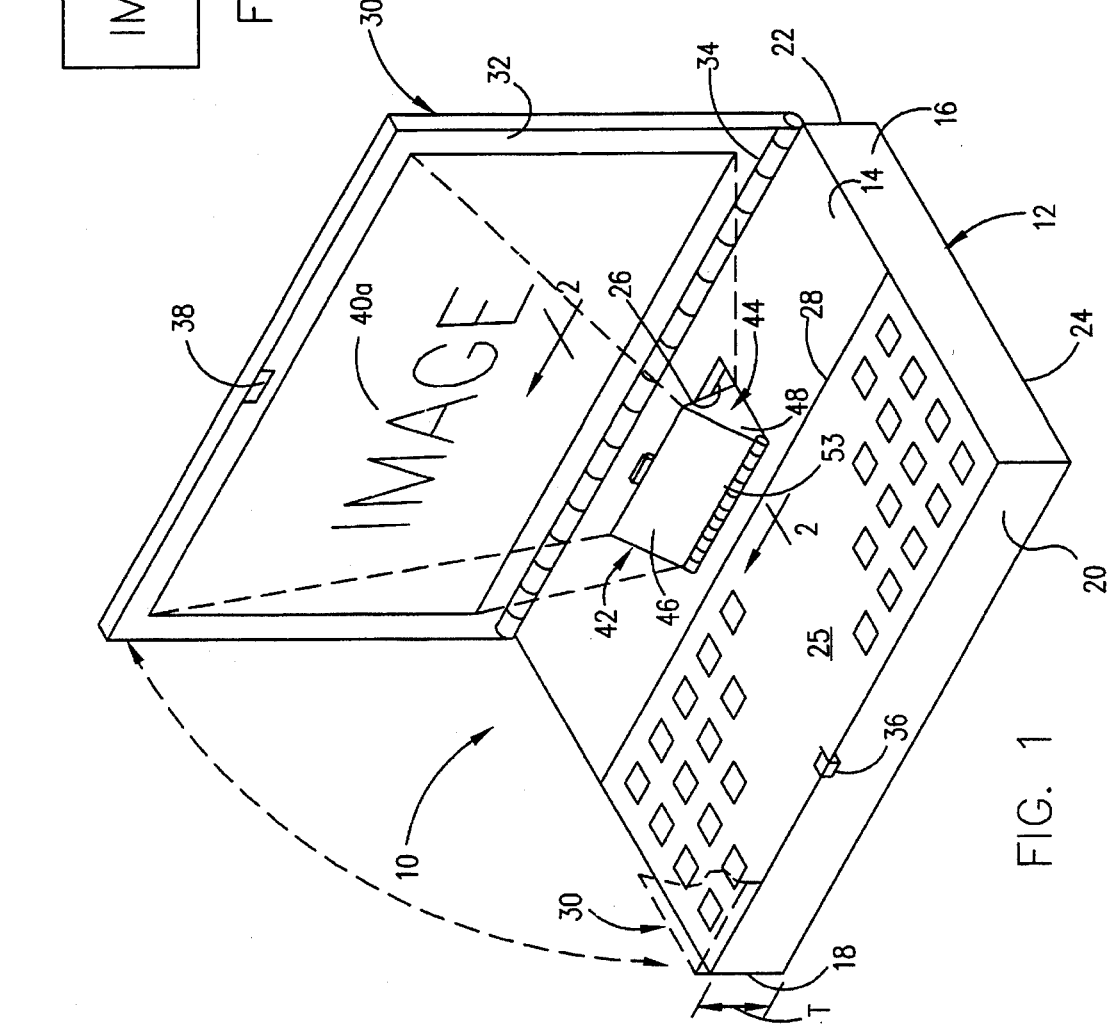
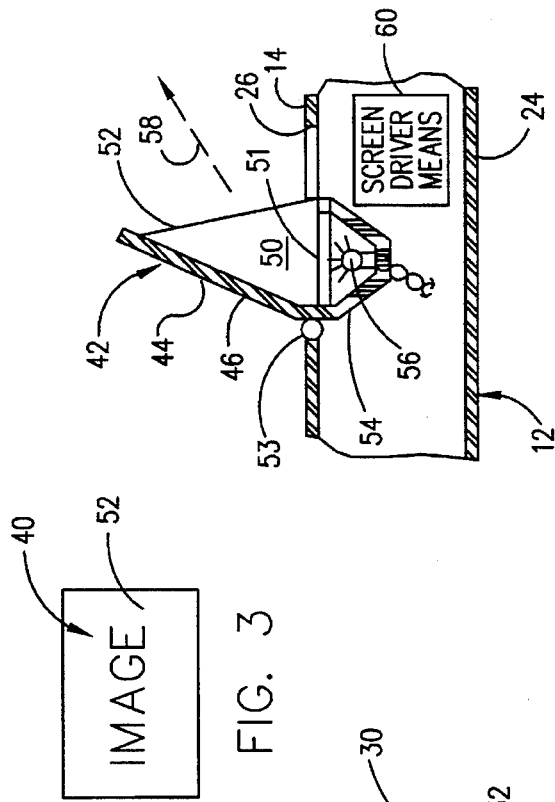
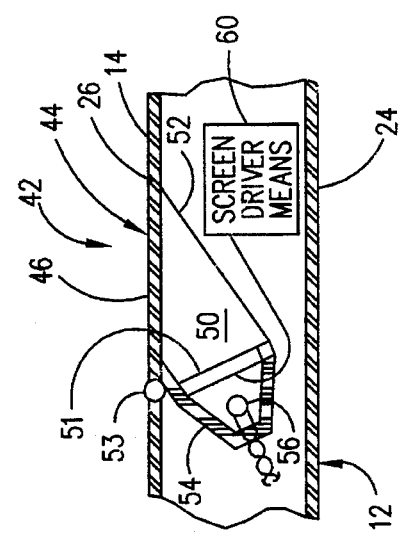

PORTABLE COMPUTER HAVING AN LCD PROJECTION DISPLAY SYSTEM

This is a Continuation of application Ser. No. 08/144,081, filed Oct. 28, 1993 now abandoned.

BACKGROUND OF THE INVENTION

The present invention generally relates to portable computers, and more particularly relates to display apparatus incorporated in portable computers such as notebook computers.

As conventionally constructed, portable computers such as laptop and notebook computers typically comprise a generally rectangular base housing in which various computer operating components, such as a motherboard, hard disk drive and floppy disk drive, are disposed. A keyboard structure is operatively mounted on the top side of the base housing forwardly of a rear side edge portion of the base housing.

A rectangular lid housing is secured to the rear side edge of the base housing for pivotal movement relative thereto between a closed storage and transport orientation in which the lid housing extends across and covers the top side of the base housing and the keyboard structure, and an open use orientation in which the lid housing extends generally transversely to the base housing and exposes a front side of the lid housing to the user of the computer. A display screen system is carried within the lid housing and is operable to create on the front side of the lid housing a selectively variable image during operation of the computer with the lid housing in its open use orientation.

The display screen system carried within the lid housing comprises an LCD panel extending across the front side of the lid housing, a back or side lighting system for illuminating the panel, and various screen driver circuitry. Packaging an LCD panel into a portable computing device of this type tends to be (1) relatively expensive due to the low production yields obtained in the fabrication of large LCD panels of this type, (2) relatively bulky (thereby undesirably increasing the thickness of the lid housing) due to the necessary size of the LCD panel and its associated illumination system, and (3) and relatively heavy due to the weight of the LCD panel itself.

It can be readily seen from the foregoing that it would be desirable to provide an improved portable computer, of the type generally described above, having incorporated therein an LCD display system that eliminates or at least substantially reduces the above-mentioned problems, limitations and disadvantages commonly associated with conventional LCD display systems for portable computers. It is accordingly an object of the present invention to provide such an improved portable computer.

SUMMARY OF THE INVENTION

In carrying out principles of the present invention, in accordance with a preferred embodiment thereof, an improved portable computer is provided and has a base housing and a screen structure. The base housing has a top side and opposite front and rear side edge portions. The screen structure has a front side surface and is secured to the rear side edge portion of the base housing for pivotal movement relative thereto between an open use orientation and a closed storage and transport orientation.

In its use orientation the screen structure projects upwardly from the rear side edge portion of the base housing with the front side surface of the screen structure forwardly facing toward the user of the computer. In its storage and transport orientation the screen structure extends across and covers the top side of the base housing with the front side surface of the screen structure facing the top side of the base housing.

Projection means are carried on the base housing forwardly of the rear side edge portion thereof and are operative to project a selectively variable image onto the front side surface of the screen structure when the screen structure is in its open use orientation. The projection means representatively comprise an LCD projection structure carried by the top side of the base housing, in a forwardly spaced apart relationship with its rear side edge portion, for pivotal movement relative to the base housing between a use orientation in which the projection structure extends upwardly from the top side of the base housing, and a retracted storage and transport orientation in which the LCD projection structure is generally flush with the top side of the base housing.

In a preferred embodiment thereof the LCD projection structure includes a lens housing pivotally connected to the top side of the base housing and pivotable into and out of a top side opening therein, a lens carried in the lens housing, an LCD projection panel supported on an underside portion of the lens and having a side surface area substantially less than the surface area of the front side of the screen structure, and a high intensity light source operative to transmit light through the LCD projection panel and into the interior of the lens.

Using conventional screen driver circuitry disposed within the base housing a selectively variable image may be created on the LCD projection panel and, using the high intensity light source, projected in magnified form onto the front side of the screen structure when the screen structure and the LCD projection structure are in their use orientations.

Because the LCD projection panel has a side surface area substantially smaller than that of the screen structure, the overall weight and size of the overall display image generating system is correspondingly reduced. Also, due to the substantially smaller size of the LCD panel, its production yield rate is desirably increased, thereby reducing the fabrication cost of the computer. Also, due to the positioning of the image generation structure remote from the screen portion of the computer the screen portion of the computer may simply be a relatively thin, solid panel member instead of the usual, much thicker lid housing structure in which a substantially larger LCD panel and its associated illumination system are conventionally disposed. The ability to substantially reduce the thickness of the computer lid portion reduces the thickness of the computer in its storage and transport orientation.

BRIEF DESCRIPTION OF THE DRAWINGS

FIG. 1 is a highly simplified perspective view of a representative notebook computer incorporating therein a specially designed LCD display system embodying principles of the present invention;

FIG. 2 is an enlarged scale cross-sectional view through the LCD projection structure of the computer taken along line 2—2 of FIG. 1 and schematically illustrates the projection structure in its upwardly pivoted use orientation;

FIG. 2A is an enlarged scale cross-sectional view similar to FIG. 2, but with the LCD projection structure in its downwardly pivoted storage and storage orientation; and FIG. 3 is a top plan view of the projection LCD panel portion of the computer illustrated in FIG. 2.

DETAILED DESCRIPTION

Perspectively illustrated in simplified form in FIG. 1 is a portable computer, representatively a notebook computer 10, embodying principles of the present invention. The computer 10 includes a generally rectangular base housing 12 in which the various operating circuitry and components of the computer are disposed. Base housing 12 has a top side wall 14, a pair of opposite right and left side walls 16 and 18, a pair of opposite front and rear side walls 20 and 22, and a bottom side wall 24. A conventional keyboard structure 25 is operatively mounted on a front portion of the top side of the base housing.

For purposes later described, a rectangular opening 26 is formed in the top side wall 14. The opening 26, as illustrated in FIG. 1, is positioned between the rear base housing side wall 22 and the rear side 28 of the keyboard structure 25, and is centrally disposed between the opposite right and left base housing side walls 16 and 18.

A display screen structure, representatively in the form of a solid, relatively thin plastic screen panel member 30 having a front side surface 32, is secured to a top rear side edge portion of the base housing 12, by a suitable hinge structure 34 for pivotal movement relative to the base housing between an open use position (shown in solid lines in FIG. 1) and a storage and transport orientation (partially depicted in dotted lines in FIG. 1). In its use position the screen panel member 30 extends generally transversely to the top side 14 of the base housing 12, with the front side surface 32 of the screen panel member facing the user of the computer. In its storage and transport orientation the screen panel member 30 extends across the keyboard structure 25 and the top housing side wall 14, with the front screen panel member side surface 32 facing the base housing top side wall 14. Cooperating latch means 36,38 are provided on the base housing and screen panel member for releasably holding the screen panel member in its closed position.

With the portable computer 10 turned on and the screen panel member 30 upwardly pivoted to its use orientation a selectively variable display image 40a is created on the front side surface 32 of the screen panel member 30. However, in contrast to portable computers of conventional construction, the image is not generated from within the screen structure. Instead, in accordance with a key aspect of the present invention, the image is generated within a relatively small LCD projection structure 42 carried by the base structure and projected in magnified from onto the front side surface 32 of the screen panel member 30 from a location forwardly spaced apart therefrom.

Referring now to FIGS. 1 and 2, the LCD projection structure 42 is disposed at the rectangular opening 26 in the top side wall 14 of the base housing 12 and includes a plastic lens housing 44 having a rectangular base wall 46 and a pair of opposite side walls 48 projecting from opposite ends thereof. A projection lens 50 having a suitably configured rear side surface 52 is captively retained in the housing 44. A front side edge portion of the base wall 46 is secured to the top side wall 14 of the base housing 12, along the front side edge of the opening 26 therein, by a suitable hinge structure 53.

With the screen panel member 30 in its upwardly pivoted use position the hinge mounting of the lens housing 44 permits the LCD projection structure 42 to be selectively pivoted into and out of the top side wall opening 26 between an upwardly tilted use orientation shown in FIG. 2 and a storage and transport orientation shown in FIG. 2A. In its use orientation the LCD projection structure 42 projects upwardly beyond the base housing top side wall 14 with the rear lens side surface 52 facing the front side surface 32 of the screen panel member 30. In its storage and transport orientation the LCD projection structure 42 is recessed into the top side wall opening 26 with the lens housing base wall 46 being flush with the top side wall 14 of the base housing 12.

The LCD projection structure 42 also includes a small LCD projection panel 51 supported, as viewed in FIG. 2, on the bottom side of the lens 50 for pivotal movement therewith. A schematically depicted support structure 54 is carried by the lens housing 44 for pivotal movement therewith, underlies the underside of the LCD projection panel 51, and carries a high intensity light source 56 that, when energized as shown in FIG. 2, transmits projection light through the panel 51, into and through the lens 50, and outwardly through the lens rear side surface 52 as indicated by the arrow 58 in FIG. 2.

During operation of the portable computer 10 conventional, schematically depicted screen driver means 60 are used to create on the LCD projection panel 51 a selectively variable image 40 (see FIG. 3) that is projected onto the front side surface 32 of the screen panel member 30 in the form of the enlarged image 40a shown in FIG. 1. As illustrated in FIG. 3, the projection LCD panel 52 has a side surface area substantially smaller than that of the screen panel member 30 and, during its use is forwardly spaced apart from the front side surface 32 of the screen panel member 30.

Various methods may be utilized to maintain, for image focusing purposes, a proper relative orientation between the rear side surface 52 of the lens 50 and the front side surface 32 of the screen panel 30. For example, the action of the hinge structure 53 may be made stiff enough so that after the screen panel member 30 is pivotally adjusted to the computer user's preference the LCD projection structure 42 may be correspondingly pivoted to a focus-adjusting position thereof and held in such position by the hinge structure 53. Alternatively, the screen panel member 30 and the LCD projection structure 42 may be mechanically linked for appropriate conjoint pivotal motion. Additionally, the pivotal orientation of the screen panel member 30 could be automatically sensed and its sensed position used to modify the output of the screen driver means 60 to configurationally modify the image 40 to adjust for the changing relative pivotal orientations of the screen panel member 30 and the LCD projection structure 42.

The use of the relatively small LCD projector panel 51 in place of a much larger LCD panel conventionally incorporated in the pivotal lid/screen portion of a portable computer provides the computer 10 with several desirable advantages. For example, the elimination of the much larger LCD panel can appreciably lower the overall fabrication cost and resulting weight of the computer. Additionally, since the display screen portion of the computer 10, as illustrated in FIG. 1, can simply be a relatively thin plastic panel member instead of the usual lid housing containing an LCD panel, an illumination system therefor, and other electronic circuitry, the thickness of the display screen portion of the computer can be substantially reduced. This thickness reduction correspondingly reduces the overall vertical thickness T of the computer in its closed storage and transport orientation.

Moreover, as is well known in the computer fabrication art, the production yield rate of the relatively large LCD panels typically incorporated in the display screen portions of portable computers is relatively low. The production yield rate for a considerably smaller LCD panel, like the panel 51, is substantially higher, thereby further reducing the overall fabrication cost of the portable computer 10.

The foregoing detailed description is to be clearly understood as being given by way of illustration and example only, the spirit and scope of the present invention being limited solely by the appended claims.

What is claimed is:

1. A portable computer comprising:

a base housing having a top side, opposite front and rear side edge portions, and an opening extending through said top side and positioned forwardly apart from said rear side edge portion;

a solid, relatively thin screen panel member having a non-mirrored front side surface and being secured to said rear side edge portion of said base housing for pivotal movement relative thereto between an open use orientation in which said screen panel member projects upwardly from said rear side portion of said base housing, with said non-mirrored front side surface of said screen panel member facing forwardly, and a closed storage and transport orientation in which said screen panel member extends across and covers said top side of said base housing with said non-mirrored front side surface of said screen panel member facing said top side of said base housing; and projection means for projecting a selectively variable image substantially exclusively onto said non-mirrored front side surface of said screen panel member when said screen panel member is in said open use orientation thereof, said projection means including:

a lens structure supported at said opening in said top side of said base housing for movement, relative to said base housing and said screen structure, through said opening between a use orientation in which said lens structure projects above said opening and a storage and transport orientation in which said lens structure is recessed in said opening, said lens structure having a rear side surface positioned to face said non-mirrored front side surface of said screen panel member when said screen panel member and said lens structure are in said use orientations thereof, and a bottom side surface extending at an angle to said rear side surface of said lens structure, an LCD projection panel extending across and against said bottom side surface of said lens structure, said LCD projection panel being operable to create a selectively variable panel image thereon, an illumination structure operative to transmit light directly through said LCD projection panel and into said lens structure, wherein said lens structure directs said light substantially exclusively onto said screen panel member forming said selectively variable panel image thereon.

2. The portable computer of claim 1 wherein said portable computer is a notebook computer.

3. The portable computer of claim 1, wherein said non-mirrored front side surface of said screen panel member is nontranslucent and substantially nonreflective.

* * * * *